(12) United States Patent
Bedrosian

(10) Patent No.: US 6,362,909 B1
(45) Date of Patent: Mar. 26, 2002

(54) LINE POWERING SHELF FOR DATA TRANSMISSION LINE

(75) Inventor: Paul Stephan Bedrosian, Andover, MA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/047,247

(22) Filed: Mar. 24, 1998

(51) Int. Cl.[7] .................................................. H04J 14/08
(52) U.S. Cl. ........................ 359/180; 359/137; 359/136
(58) Field of Search ................................. 359/135, 137, 359/174, 176, 180; 370/466, 467, 907; 379/413

(56) References Cited

U.S. PATENT DOCUMENTS

| | | | | |
|---|---|---|---|---|
| 5,144,466 A | * | 9/1992 | Nakamura et al. | 359/123 |
| 5,335,105 A | * | 8/1994 | Carlton | 359/135 |
| 5,343,461 A | * | 8/1994 | Barton et al. | 370/13 |
| 5,381,413 A | * | 1/1995 | Tobagi et al. | 370/85.6 |
| 5,455,700 A | * | 10/1995 | Thompson et al. | 359/135 |
| 5,457,560 A | * | 10/1995 | Sharpe et al. | 359/137 |
| 5,541,957 A | * | 7/1996 | Lau | 375/258 |
| 5,870,466 A | * | 2/1999 | Koenig et al. | 379/399 |
| 5,994,998 A | * | 11/1999 | Fisher et al. | 340/310.01 |
| 6,040,759 A | * | 3/2000 | Sanderson | 340/310.01 |
| 6,049,550 A | * | 4/2000 | Baydar et al. | 370/466 |
| 6,064,513 A | * | 5/2000 | Wada | 359/337 |
| 6,181,710 B1 | * | 1/2001 | Cooper et al. | 370/467 |
| 6,229,432 B1 | * | 5/2001 | Fridley et al. | 340/310.01 |

* cited by examiner

*Primary Examiner*—Leslie Pascal
*Assistant Examiner*—Dalzid Singh
(74) *Attorney, Agent, or Firm*—Joseph E. Funk

(57) ABSTRACT

A system for transmitting data signals across a data transmission line in accord with a specified digital data transport protocol utilizes a powering shelf for powering the line. To that end, the line electrically couples the powering shelf with a signal converter that converts the data signals to optical signals. The signal converter includes a first interface for receiving a first data signal complying with the protocol from the line, and a housing. The powering shelf, which is external to the converter housing, preferably includes a first powering circuit for the first interface.

30 Claims, 9 Drawing Sheets

LINE POWERING SHELF FOR DATA TRANSMISSION LINE

FIELD OF THE INVENTION

This invention generally relates to communication networks and, more particularly, to powering data transmission lines in a communication network.

BACKGROUND OF THE INVENTION

Data signals in a communication network commonly are transmitted in a line in accordance with a data transport protocol (i.e., a physical layer protocol of the O.S.I. model). "T1" is one such transport protocol in which digital data is transmitted, in the format of a DS1 signal, across copper transmission lines at a rate of about 1.54 megabits per second. Like data signals utilizing other data transport protocols, the signal quality of a signal utilizing the T1 protocol (a "T1 signal") must be restored about every 6,000 feet by repeaters or other signal regeneration devices. In addition, the T1 protocol requires line powering so that equipment such as, for example, a transmitting device may be energized merely by connecting to the transmission line.

T1 signals typically are transmitted from a transmitting device (e.g., a modem) to a destination device (e.g., a central office) via a series of transmission lines and repeaters. Accordingly, a T1 signal requires a relatively large number of repeaters to transmit a single signal many miles. This requirement, however, increases the overall cost of a T1 communications system. The art has responded to this problem by coupling signal converters to the transmission line to convert T1 signals (and their accompanying DS I signals) into fiber optic signals. Once converted, the fiber optic signals may be transmitted long distances, via fiber optic cable, to the destination device. Fewer repeaters thus are necessary. Such signal converters typically include a circuit board having interlace circuitry for receiving a T1 signal (and their accompanying DS1 signals) prior to converting the signal. In addition, signal converters that receive T1 signals include powering circuitry for providing line powering in accord with the T1 protocol. One commonly used signal converter, for example, is a DDM-2000™ signal converter, available from Lucent Technologies Inc. of Murray Hill, N.J.

Although fewer are required when using a signal converter, repeaters frequently are necessary in the portion of the line between the transmitter and the signal converter. Accordingly, there still is a need to reduce the number of repeaters to improve cost effectiveness. The art has responded to this need by developing the High-Bit-Rate Digital Subscriber Line digital data transport protocol ("HDSL"). As is known in the art, an HDSL carrier signal typically can be transmitted up to about 2.0 miles over existing copper lines and thus, requires fewer repeaters (if any) between the transmitter and the signal converter. Another advantage of HDSL is that it provides improved signal quality that is comparable to fiber optic data transmission. A DS1 signal may be interleaved upon an HDSL carrier signal to carry such DS1 signal up to about 2.0 miles. For more information relating to HDSL, see "CopperOptics, Enhancing the Performance and Application of Copper Cable with HDSL: A Technology Brief from PairGain Technologies, Inc." at http://www.pairgain.com/copperop.htm."

In a manner similar to signal converters that receive and convert T1 signals, signal converters that receive and convert HDSL signals also have a circuit board with both interface circuitry for receiving an HDSL signal prior to conversion, and line powering circuitry for powering the line in accordance with the HDSL protocol. Undesirably, however, the line powering circuitry for the HDSL protocol physically is much larger and generates much more heat than the powering circuitry that may be utilized with the T1 protocol. As a result, a signal converter that can accept four T1 signals may not be large enough to receive four HDSL signals absent significant redesign. For example, the DDM-2000™ signal converter can be configured to receive either multiple independent T1 signals, or one HDSL signal. Accordingly, several times as many DDM-2000™ signal converters are required when using the HDSL protocol than those that are necessary for use with the T1 protocol. Of course, this requirement necessarily increases the ultimate cost of such a data communication network, thus offsetting some of the benefits of utilizing the HDSL protocol.

SUMMARY OF THE INVENTION

In accordance with one aspect of the invention, a system for transmitting data signals across a data transmission line in accord with a specified digital data transport protocol utilizes a powering shelf for powering the line. To that end, the line electrically couples the powering shelf with a signal converter that converts the data signals to optical signals. The signal converter includes a first interface for receiving a first data signal complying with the protocol from the line, and a housing. The powering shelf, which is external to the converter housing, preferably includes a first powering circuit for the first interface.

In accordance with another aspect of the invention, the signal converter includes a second interface for receiving, from the line, a second data signal complying with the protocol. The powering shelf correspondingly includes a second powering circuit for the second interface. In preferred embodiments, the protocol is HDSL and the line is a copper line. The powering shelf also may include transmission circuitry that receives and transmits the first data signal without significantly modifying it. In preferred embodiments, the transmission circuitry includes a one to one transformer.

The first data signal may be transmitted from a transmitting device and the powering circuitry may be configured to power the transmitting device. In some embodiments, the transmitting device is an HDSL modem. Moreover, the powering shelf may include signal converter powering circuitry for powering the signal converter, or it may include sealing current circuitry for providing sealing current to the line. The powering shelf also may include circuitry for providing a current of no greater than about 100 milliamps, and a voltage of up to about 200 volts.

In yet other aspects of the invention, the powering shelf may include powering circuitry for powering the line in accord with the protocol, an input line interface for receiving data signals from the line, and an output interface for transmitting data signals to the line. In preferred embodiments, the powering shelf is external to the signal converter housing and communicates with the signal converter via the line.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF PREFERRED EMBODIMENTS

Figure 1:
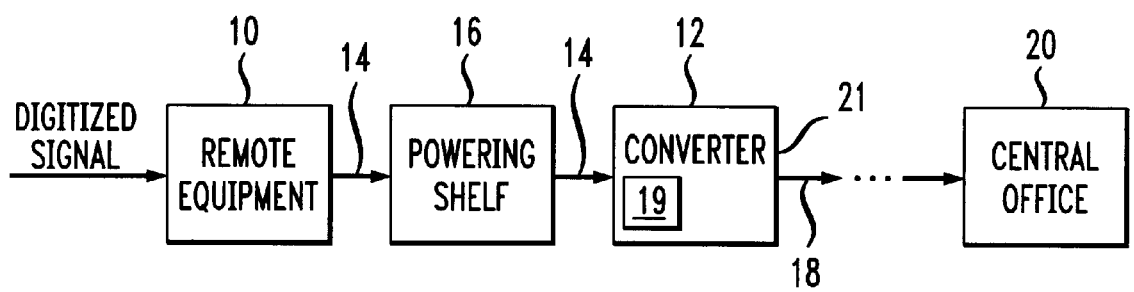
FIG. 1 schematically shows a network utilizing a preferred embodiment of the invention.

FIG. 1 schematically shows one of many network arrangements that may utilize a preferred embodiment of the invention with the HDSL data transport protocol. It should be noted, however, that this network configuration is exemplary and is not intended to limit the scope of the invention. Moreover, although the HDSL data transfer protocol is discussed with reference to preferred embodiments of the invention, the concepts discussed herein may be applied to other data transport protocols.

The network includes remote equipment 10 for interleaving a digitized signal in DS1 format with an HDSL carrier signal, a signal converter 12 for converting the HDSL carrier signal (and its accompanying DS1 signal) into an optical signal, a data transmission line 14 coupling the signal converter 12 and the remote equipment 10, and a powering shelf 16 for powering the line 14 in accordance with the HDSL protocol. In preferred embodiments, the line 14 is a twisted pair line 14 manufactured substantially from copper. A fiber optic cable 18 is coupled to the output of the signal converter 12 for directing the fiber optic signal to a central office 20. Once at the central office 20, the signal may be demultiplexed from DS1 format and distributed as necessary. In preferred embodiments, the distance between the remote equipment 10 and the signal converter 12 is no greater than about 2.0 miles, while the distance between the signal converter 12 and central office 20 may be many miles.

The signal converter 12 preferably is an add/drop multiplexer, or a digital-access service multiplexer such as, for example, the DDM-2000™ signal converter, available from Lucent Technologies. The DDM-2000™ is configured to include signal interface circuitry 19 (on an interface circuitry circuit board) within a housing 21 for receiving four independent HDSL, carrier signals from the line 14. The signal interfaces 19 preferably are HDSL interfaces, available from PairGain Technologies, Inc. of Tustin, Calif. Each received HDSL signal is converted to an optical signal by converting circuitry (not shown) in accordance with conventional processes. In preferred embodiments, the optical signal is formed in accord with conventionally known SONET (Synchronous Optical Network) technology.

In accordance with preferred embodiments of the invention, line powering circuitry is not mounted within the housing 21 of the signal converter 12. Instead, line powering circuitry is included in the powering shelf 16 and thus, is coupled to the signal converter 12 via the transmission line 14. As such, the shelf 16 is a stand-alone network component that is configured to both power the data transmission line 14, and transmit received data signals with a minimum of distortion or signal modification. In preferred embodiments, the line powering circuitry is contained within a rectangularly-shaped housing (not shown) having height of about 5 inches, a width of about 11 inches, and a length of about 23 inches.

Figure 2:
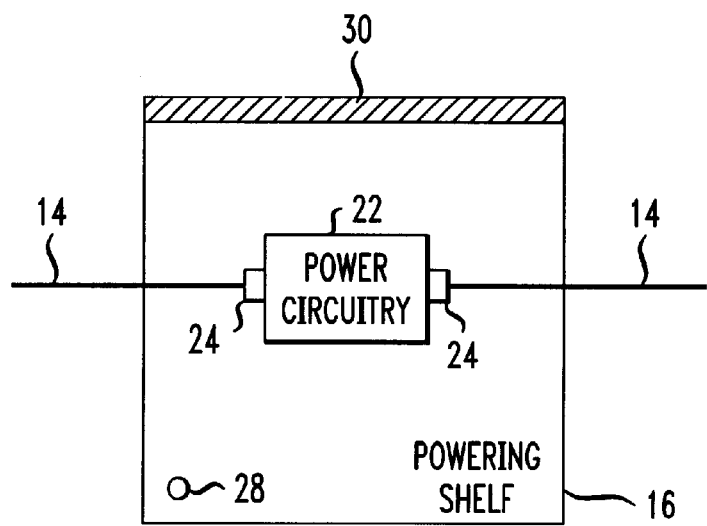
FIG. 2 schematically shows a powering shelf configured in accordance with preferred embodiments of the invention.

FIG. 2 schematically shows a preferred embodiment of the powering shelf 16. Among other things, the powering shelf 16 includes powering circuitry 22 and a plurality of interfaces 24 to the powering circuitry 22. For example, the powering shelf 16 may have four input interfaces 24 and four corresponding output interfaces 24 that form four input/output interface pairs. Each input/output pair includes an HDSL powering module 26 (FIGS. 3A–3H and 4A–4H) that provides line powering for each of the four HDSL signal interfaces 19 on the signal converter 12. In preferred embodiments, the powering shelf 16 includes twenty-eight input/output interface pairs and twenty-eight corresponding HDSL powering modules 26 to provide line powering for twenty-eight different HDSL signal interfaces 19. Since the preferred signal converter 12 includes only four HDSL signal interfaces 19, the twenty-eight HDSL signal interfaces preferably are distributed across various signal converters 12.

Each powering module 26 may be configured to provide a preselected output voltage and current. In preferred embodiments, each module 26 provides an output voltage of about 1440 volts D.C. and a current of no greater than about 100 milliamps. Other preselected output voltages (e.g., about 200 volts) and current values, however, may be utilized. In addition. each powering module 26 preferably includes an output port (FIGS. 3A–3H) for delivering the output voltage and providing a port for testing the output voltage, and a current limiting element or limiting the maximum amount of current that may be delivered. For example, a conventional fuse may be utilized for such purposes. The current limiting element may be used to protect against overcurrent conditions caused by different events such as, for example, a lightening strike in the line 14. In preferred embodiments, the current limiting element is configured in accord with the well known Bellcore standard GR-1089-CORE See "Generic Requirements for High-Bit-Digital-Subscribe-Lines (TA-NWT-001210), published by Bellcore of Morristown, N.J., for additional information relating to the Bellcore standard GR-1089-CORE. Such document is incorporated herein, in its entirety, by reference.

Each powering module 26 also may include a relay coupled to a light emitting diode to visually indicate if a fault condition exists within such powering module 26. For example, the relay initially may be set to a zero value to indicate a no fault condition, and automatically switch to a one value when a fault condition is detected. The light emitting diode may be energized when the relay is set to a one value. In addition, each of the relays in the powering circuit may be coupled via a logical "OR" gate to indicate whether a fault condition exists within the powering shelf 16. A single light emitting diode 28 may be illuminated when a fault condition is detected by the logical OR gate. More particularly, power may be supplied to the light emitting diode 28 when a one value is detected by the OR gate, thus visually indicating that a fault condition exists within one of the powering modules 26.

The powering shelf 16 also includes a heat dissipating apparatus for dissipating heat produced by the powering modules 26. The heat dissipating apparatus preferably is a plurality of baffles 30. In preferred embodiments, the baffles are arranged to dissipate up to about 86 watts (i.e., about three watts per interface pair). Although not necessary, cooling fans also may be used to further dissipate generated heat.

Each powering module 26 preferably is configured to conform with Bellcore standard GR-1089-CORE for electromagnetic emissions and immunity. Furthermore, each powering module 26 preferably conforms with that standard with regard to maximum voltage and current level allowed for a connection.

The powering modules 26 may be configured for powering different portions of the line 14. FIGS. 3A–3H show various exemplary line powering network configurations that may be utilized for each powering module 26. Specifically, the powering modules 26 may be configured to provide various combinations of energizing voltage and sealing current to either or both of the remote equipment 10 and the signal converter 12. As is known in the art, sealing current provides a low current flow (e.g., about ten milliamps) through a current loop to limit line corrosion.

In each of the line powering configurations shown in FIGS. 3A–3H, the signal converter 12 includes two converter transformers 32, the powering shelf 16 includes two shell transformers 34, and the remote equipment 10 includes two remote transformers 36. The shelf transformers 34 preferably are configured to enable data signals to pass through the powering shelf 16 without being distorted or otherwise modified. Accordingly, the transformers preferably include one to one inductors. In preferred embodiments, the shelf transformers 34 may have the following requirements:

| | |
|---|---|
| Isolation: | 1500 VAC; |
| Turns Ratio: | 1 to 1; |
| Sec. Inductance: | 3.24 mH plus or minus five percent; |
| Total Inductance: | 9.985 mH plus or minus five percent; and |
| Longitudinal Balance: | 55 dB minimum, 2.5 kHz to 200 kHz. |

Though not having identical requirements, a WV-16854 SMT transformer also may be utilized to provide suitable termination. In addition, the longitudinal balance of the shelf transformers 34 preferably comply with the Bellcore TA-NWT-0001089 standard. This requirement recommends that there be identical components between each line and earth ground, and that the transformer be carefully designed to have high longitudinal balance. As is known in the art, high longitudinal balance prevents common-mode power supply noise on a wire pair from becoming a differential voltage that interferes with data transmission.

Each of the powering modules 26 shown in FIGS. 3A–3H also requires a DC power supply 38. In preferred embodiments, this power supply 38 is about 48 volts DC. Power may be supplied by a battery, or from some external AC source. When supplied from an AC source, the powering shelf 16 includes voltage regulation circuitry to convert the AC voltage into a DC signal. Zener diode based regulator circuits should provide satisfactory power conversion for these purposes.

Figure 3A:
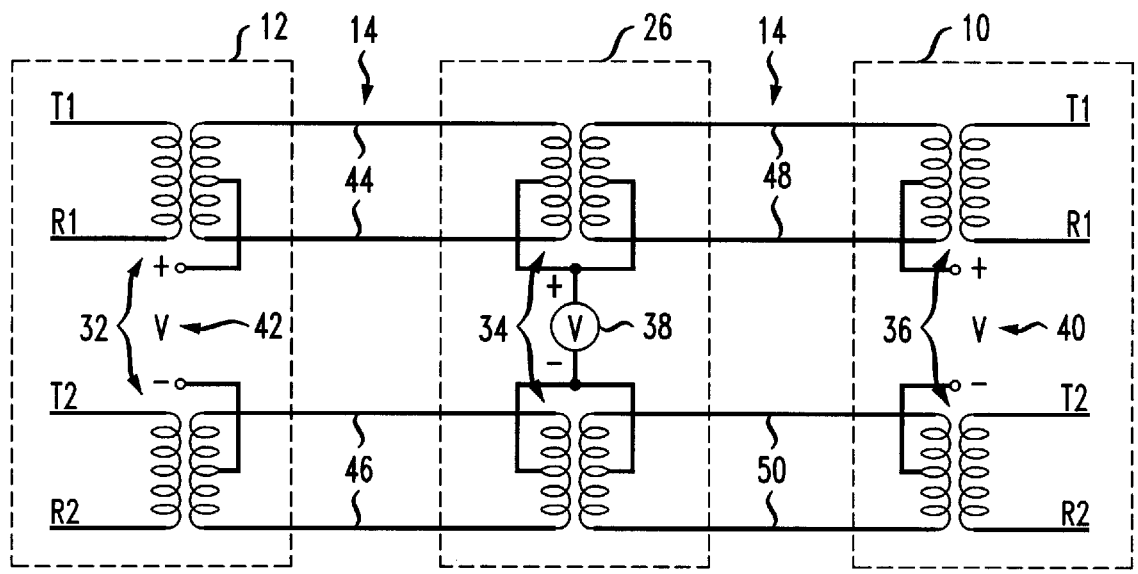
FIGS. 3A–3H schematically show various embodiments of the powering circuitry modules for an HDSL implementation.

FIG. 3A shows a first line powering configuration in which energizing voltage is provided to both the remote equipment 10 and the signal converter 12. More particularly, the power supply 38 is coupled to the center taps of each inductor in the two shelf transformers 34, a remote voltage port 40 is provided at the remote equipment 10, and a converter voltage port 42 is provided at the signal converter 12. As shown in FIG. 3A, the remote voltage port 40 and converter voltage port 42 are provided across the center taps of their respective pairs of transformers. This configuration forms a first low side loop 44 and a first high side loop 46 between the converter 12 and the powering shelf 16. The low side loop has a more negative voltage than the high side loop. Accordingly, connection of remote equipment 10 (e.g., an HDSL modem) across the remote voltage port 40 completes the circuit, thus powering such remote equipment 10.

In a similar manner to the circuit between the powering shelf 16 and remote equipment 10, the circuit between the powering shelf 16 and signal converter 12 includes a second low side loop 48 and a second high side loop 50. The low side loop has a more negative voltage than that of the high side loop. Accordingly, connection of the signal converter circuitry across the converter voltage port 42 completes the circuit, thus powering such signal converter 12.

Figure 3B:
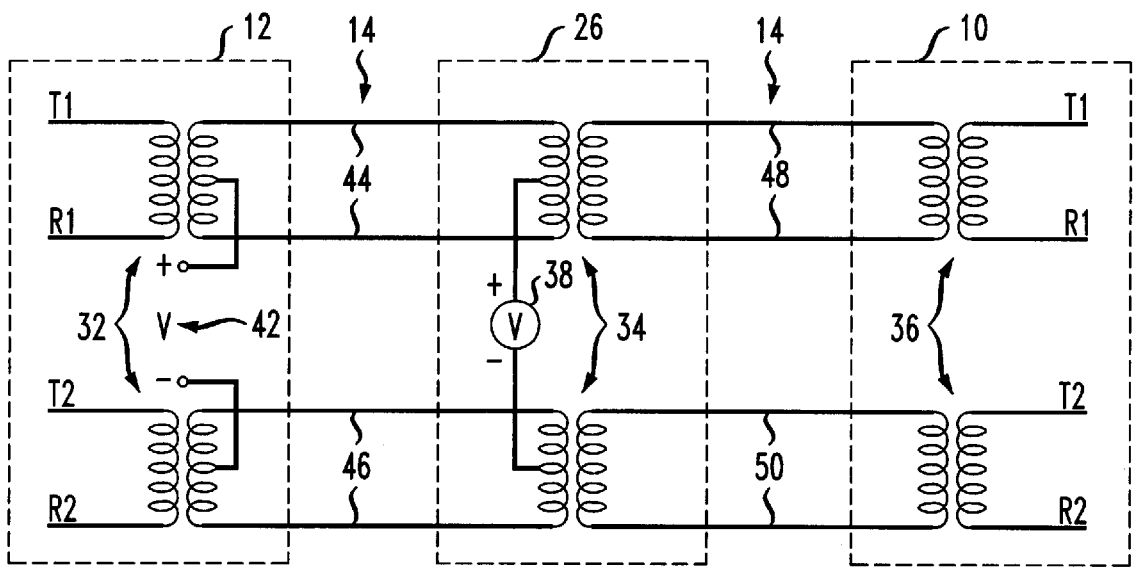

FIG. 3B shows another line powering configuration in which energizing voltage is provided to the signal converter 12 only. No powering voltage therefore is provided to the remote equipment 10. To that end, the power supply 38 is coupled to one inductor in each of the two shelf transformers 34. The coupled inductors respectively also form a part of the second low side loop 48 and the second high side loop 50 between the powering shelf 16 and the signal converter 12. The converter voltage port 42 thus is utilized to receive the powering voltage. It should be noted that this embodiment does not include a remote voltage port 40 since the remote equipment 10 is not powered.

Figure 3C:
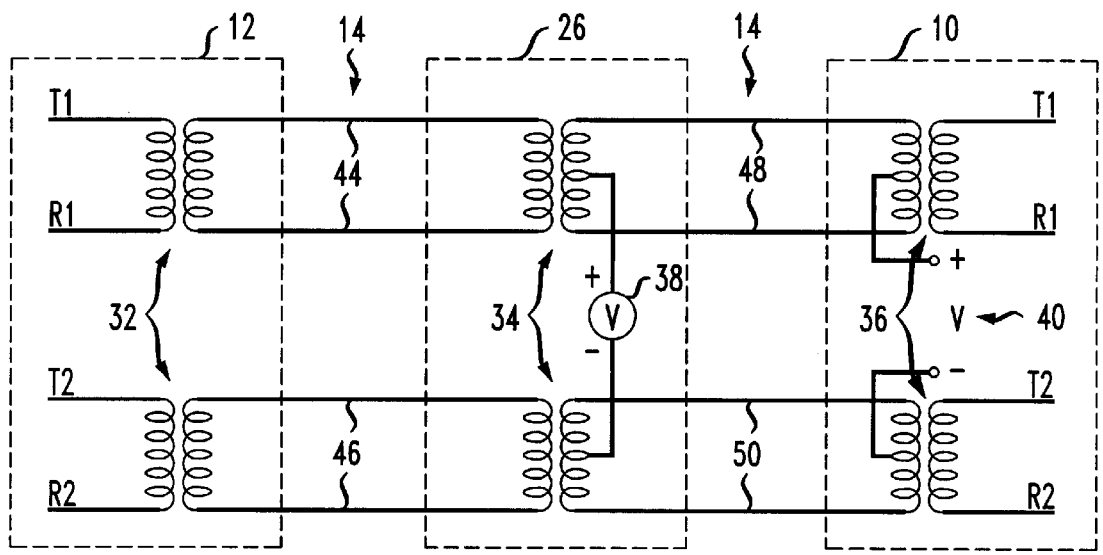

FIG. 3C shows another line powering configuration that provides energizing voltage to the remote equipment 10 only. In a manner similar to the configuration shown in FIG. 3B, the power supply 38 is coupled to one inductor in each of the two shelf transformers 34. The coupled inductors respectively also form a part of the first low side loop 44 and the first high side loop 46 between the powering shelf 16 and the remote equipment 10. The remote voltage port 40 thus is utilized to receive the powering voltage. It should be noted that this embodiment does not include a converter voltage port 42 since the signal converter 12 is not powered.

Figure 3D:
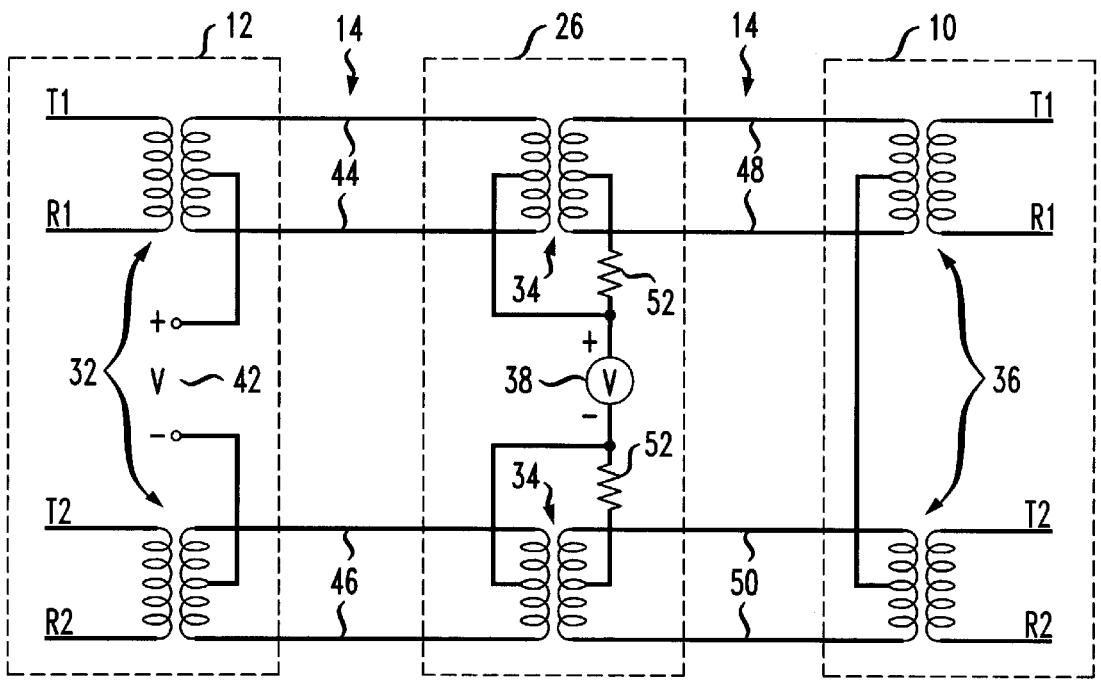

FIG. 3D shows yet another line powering configuration in which sealing current is provided to the remote equipment 10 and powering voltage is provided to the signal converter 12. In this embodiment, the power supply 38 is coupled to one of the inductors of each of the shelf transformers 34 that are used with the signal converter 12 (similar to those in FIG. 3B). In addition, the power supply 38 also is coupled to the other of the inductors that are used with the remote equipment 10 (i.e., the first low side and first high side loops 44 and 46). Resistors 52 are coupled between the power supply 38 and the other of the remote inductors to reduce the current to about ten milliamps. The resistor values are selected based upon a number of circuit factors such as, for example, the length and inductance of the line 14. The center taps of the remote transformers 36 are electrically coupled to complete the circuit. thus providing the sealing current.

Figure 3E:
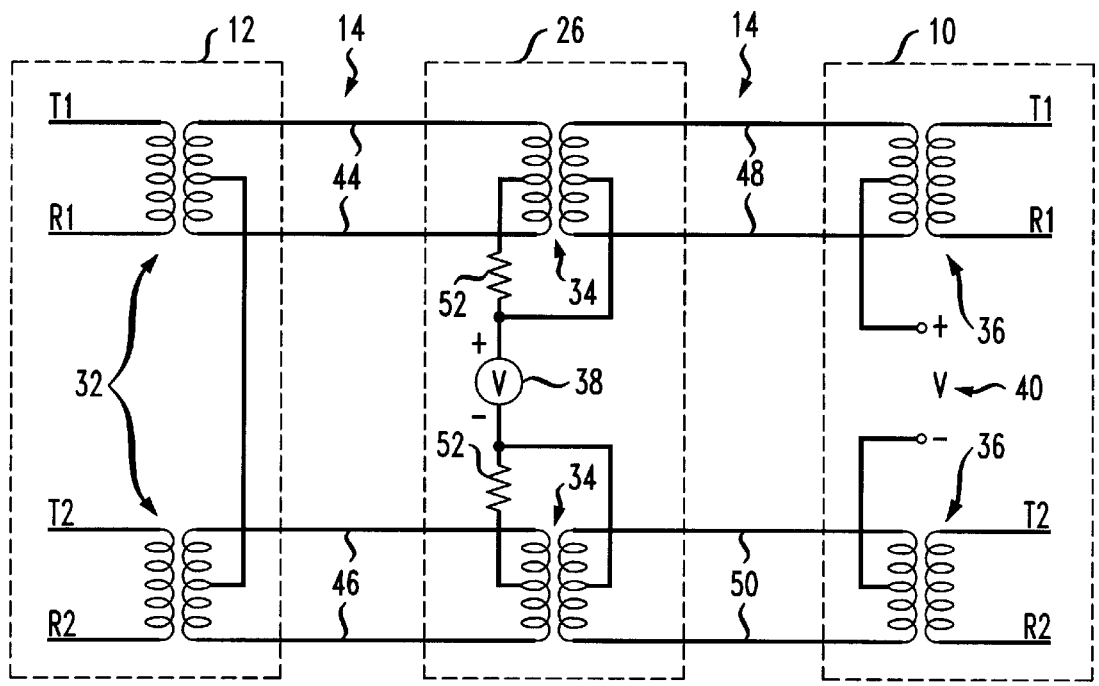

FIG. 3E shows another embodiment that is similar to that shown in FIG. 3D. The primary difference is that the powering module 26 provides powering voltage to the remote equipment 10 and sealing current to the signal converter 12. As can be ascertained by those skilled in the art, the powering module 26 includes substantially identical elements to that configuration shown in FIG. 3D. As shown in FIG. 3E, those elements are coupled in an opposite manner to those shown in FIG. 3D.

Figure 3F:
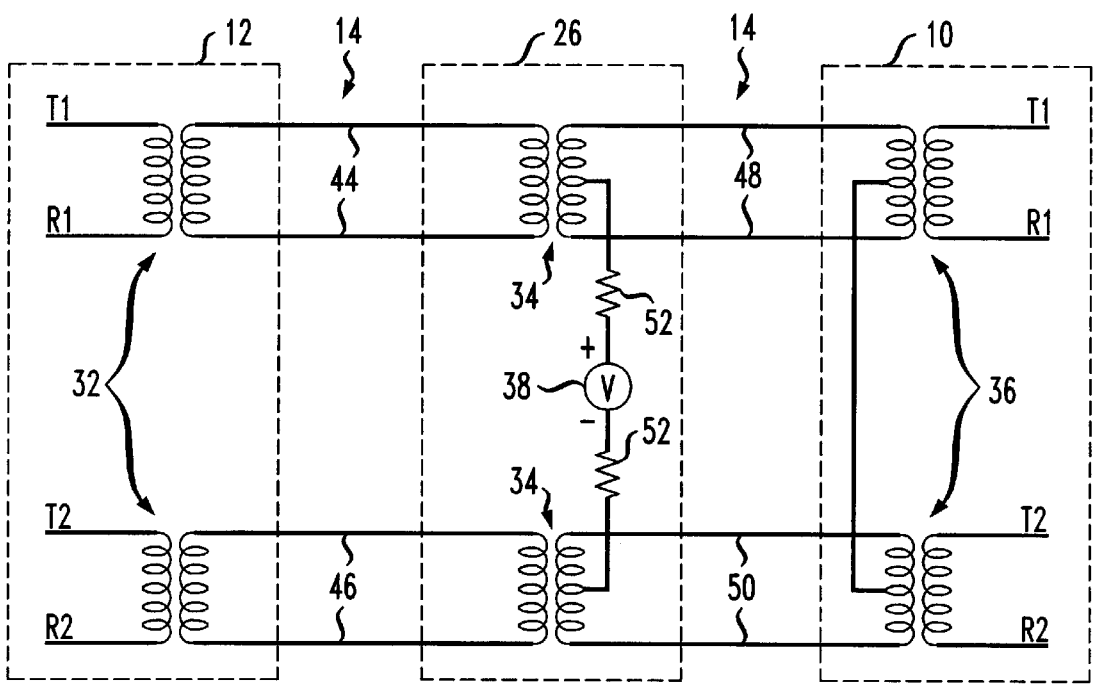
Figure 3G:
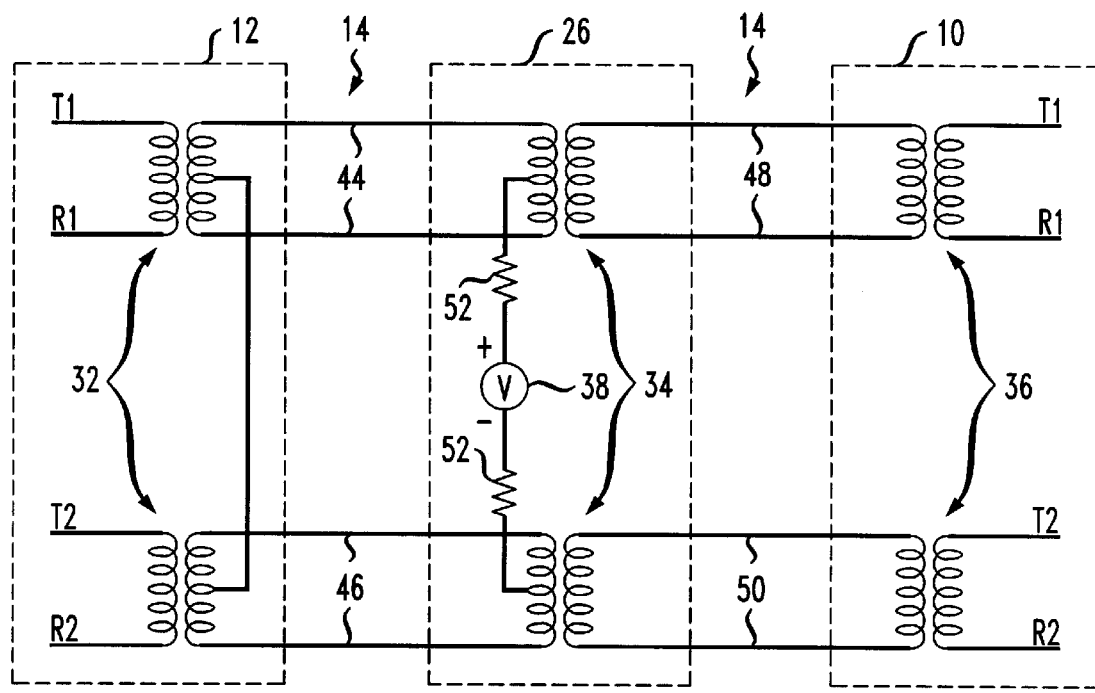
Figure 3H:
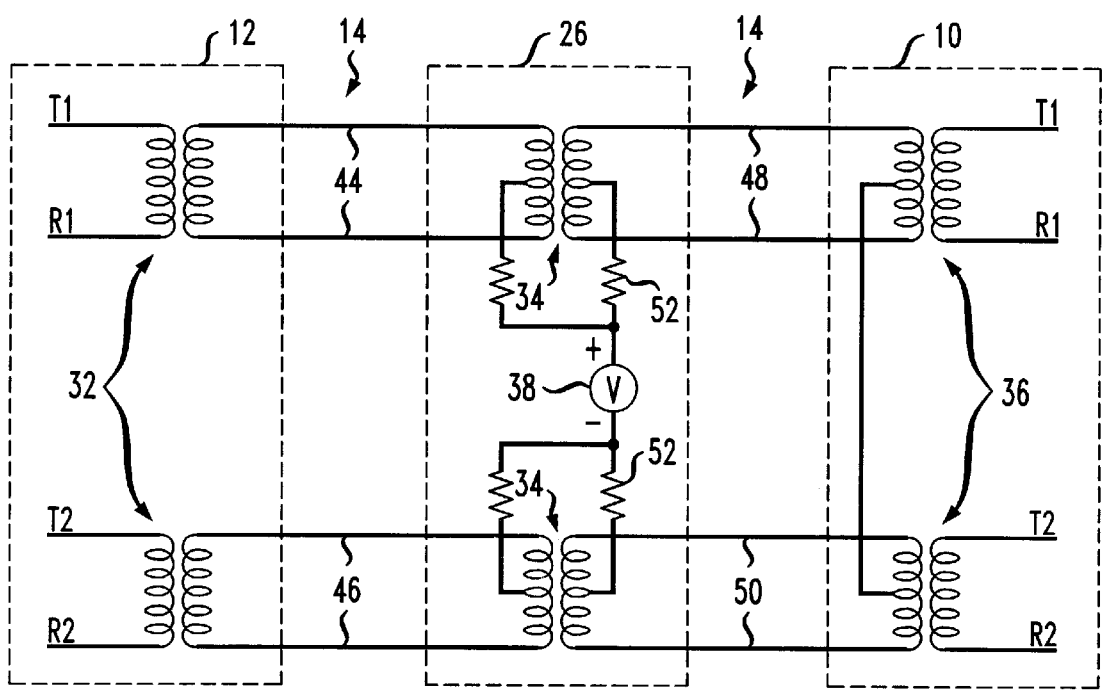

FIGS. 3F, 3G, and 3H respectively show line powering configurations that provide sealing current to:1) the remote equipment 10 only (FIG. 3F), 2) the signal converter 12 only (FIG. 3G); and 3) both the signal converter 12 and the remote equipment 10 (FIG. 3H). As shown in the figures, the elements in each of these embodiments may be coupled in a manner substantially similar to those shown in FIG. 3D and 3E.

FIGS. 4A–4H also show various line powering configurations when utilizing an alternative embodiment of the invention with single-ended HDSL. In a manner similar to the configurations shown in FIGS. 3A–3H, the remote equipment 10 includes two remote transformers 36, the powering shelf 16 includes two shelf transformers 34, and the signal converter 12 includes two converter transformers 32. In addition, the powering shelf 16 also includes a power supply 38. Each of the configurations provide corresponding sealing current and/or powering voltage to one or both of the signal converter 12 and the remote equipment 10.

Figure 4A:
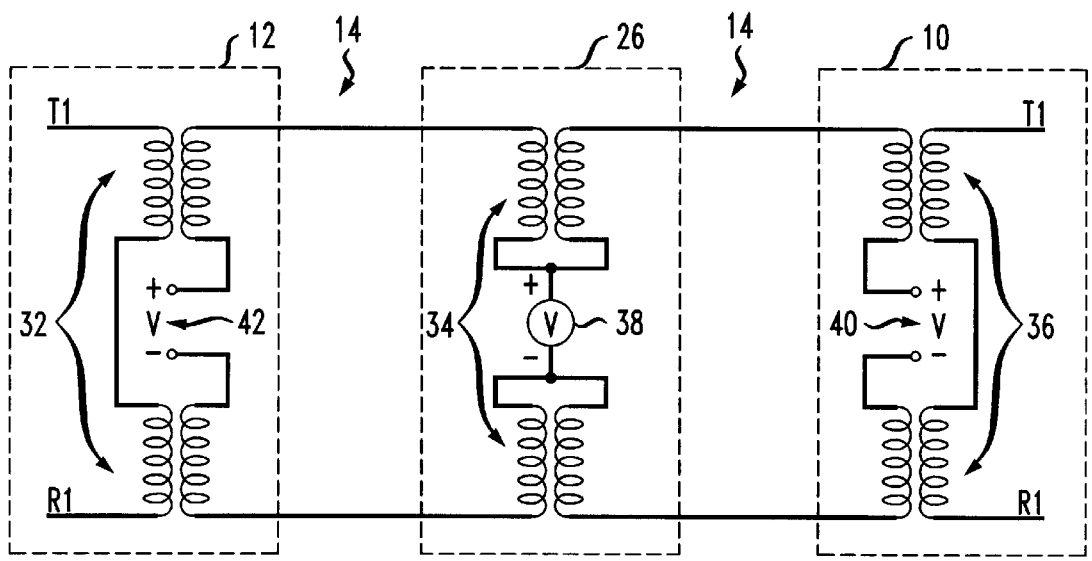
FIGS. 4A–4H schematically show various embodiments of the powering circuit modules for a single-ended HDSL implementation.
Figure 4B:
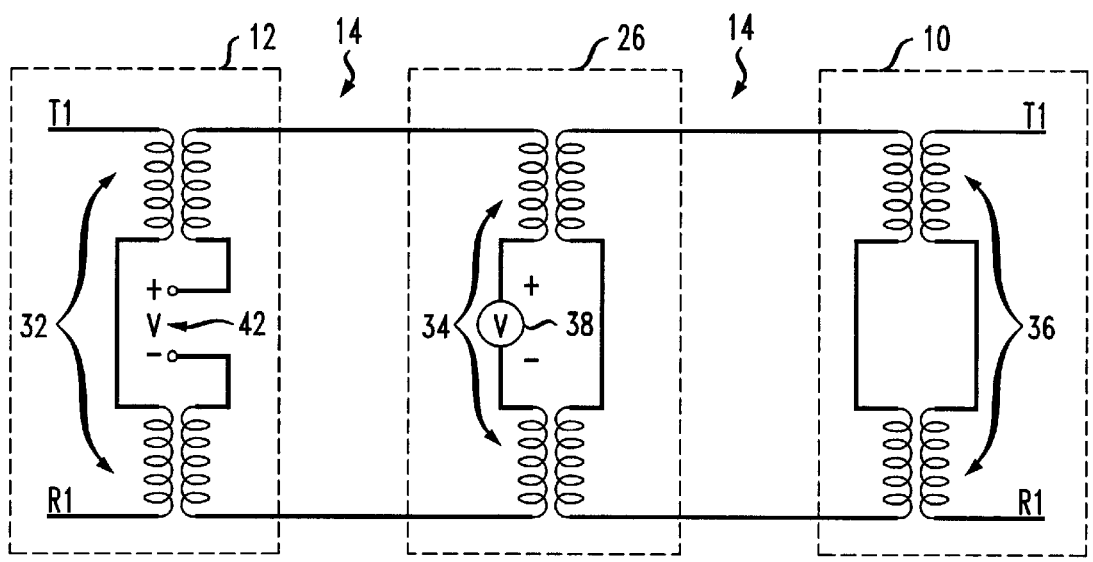
Figure 4C:
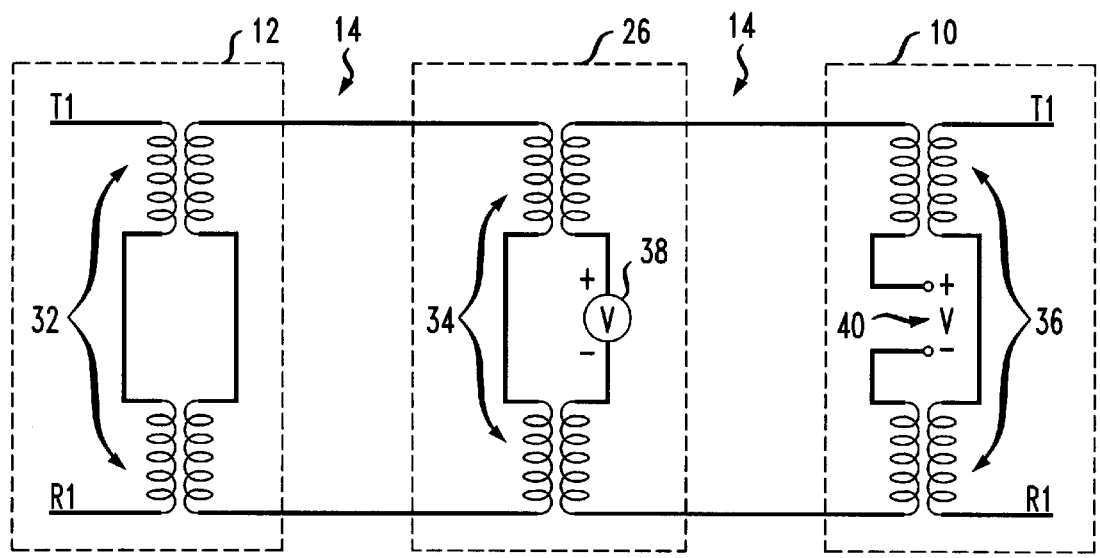
Figure 4D:
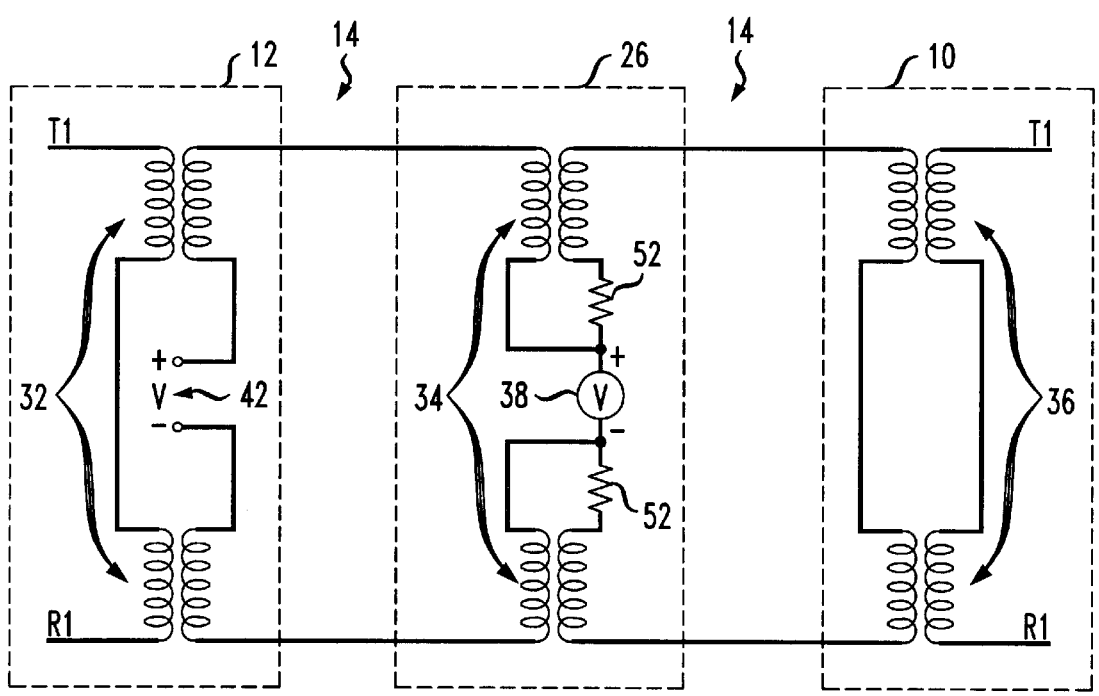
Figure 4E:
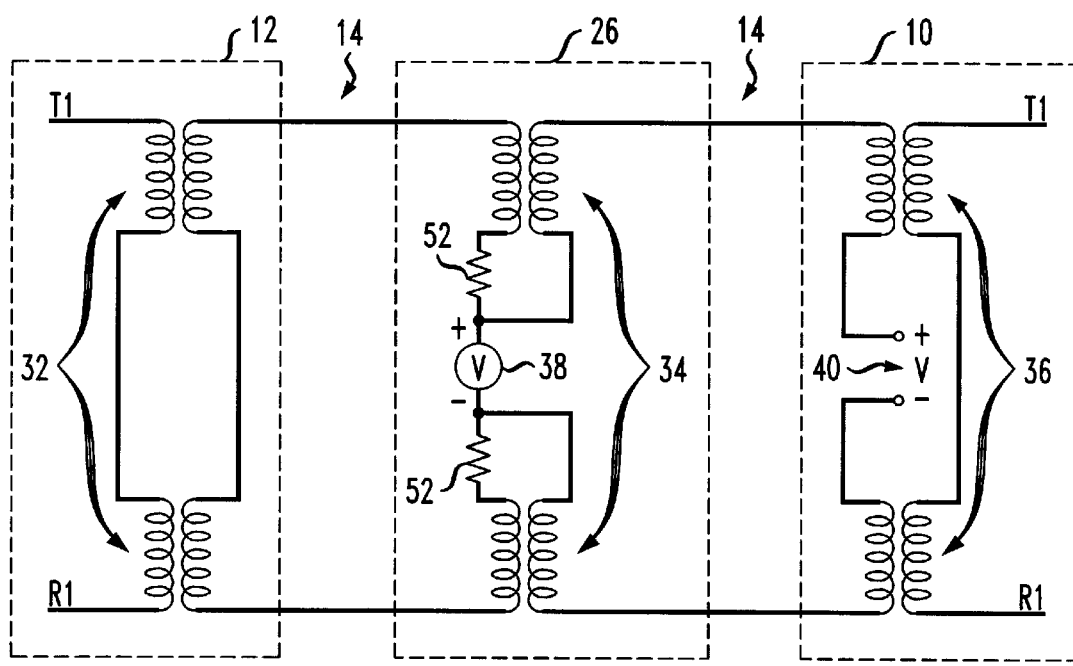
Figure 4F:
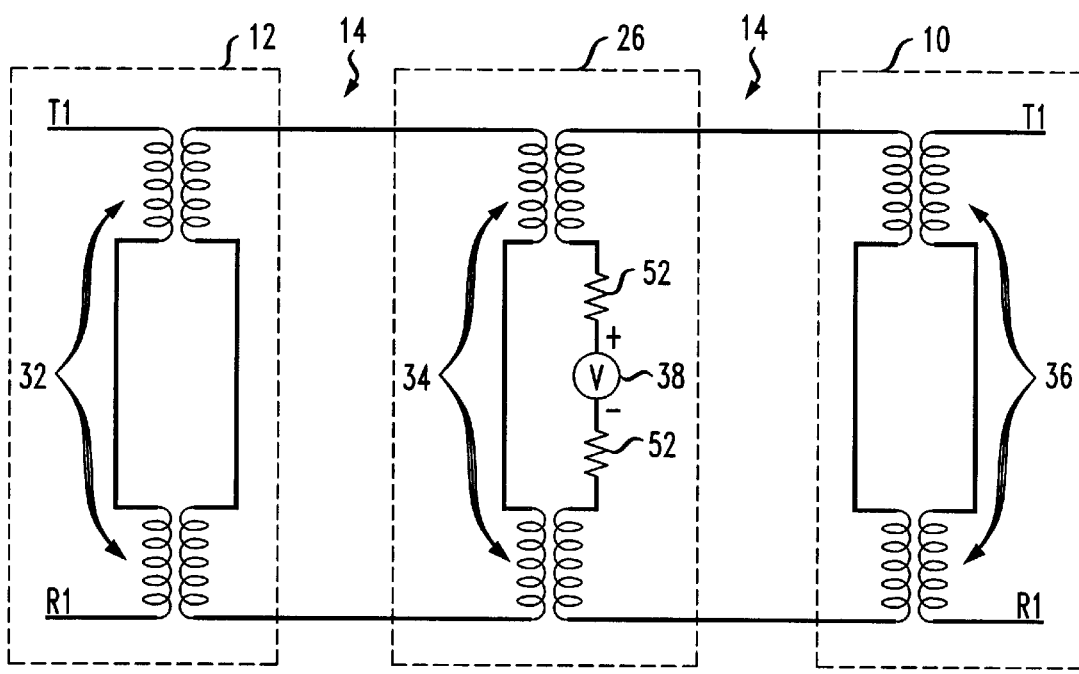
Figure 4G:
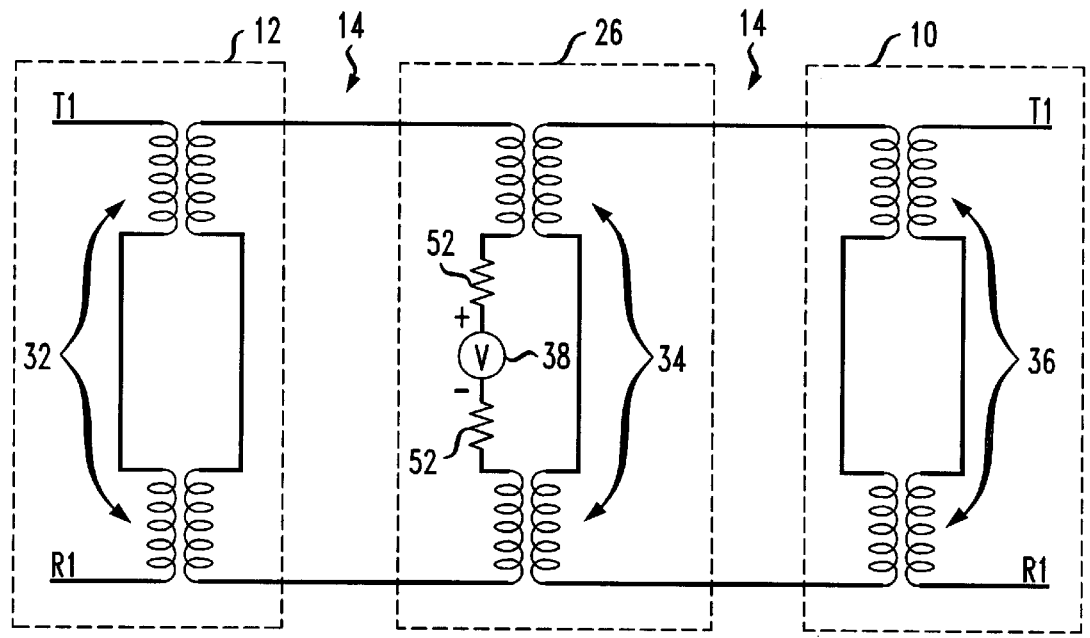
Figure 4H:
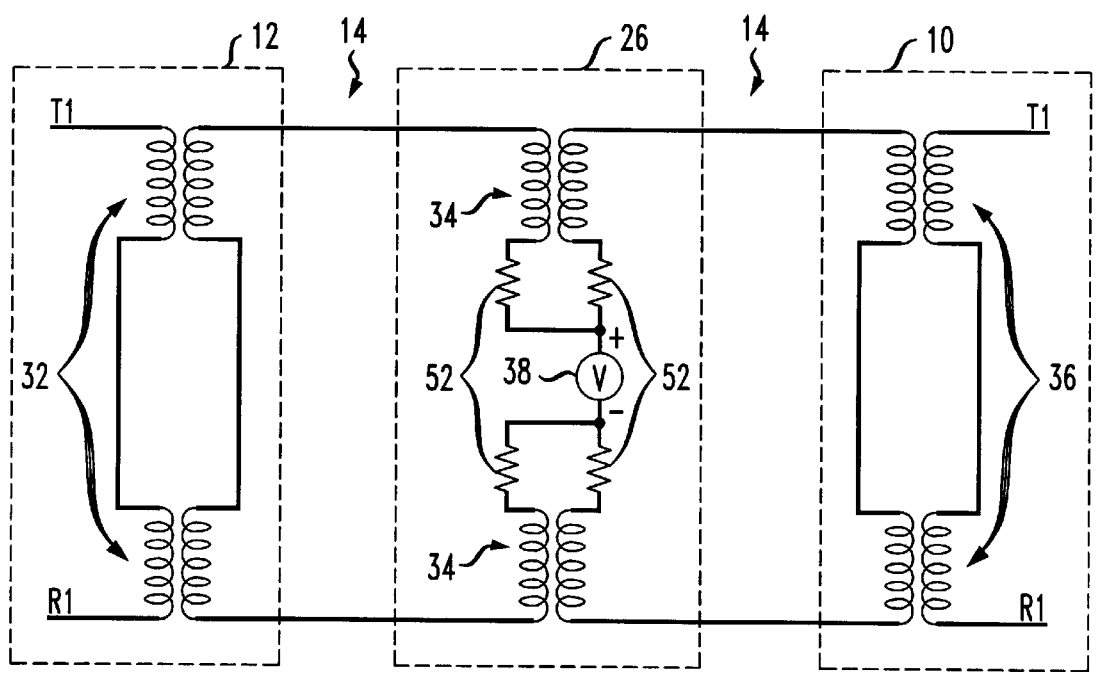

More particularly, the configuration in FIG. 4A provides powering voltage to both the signal converter 12 and the remote equipment 10. The configurations in FIGS. 4B and 4C respectively provide powering voltage to the signal converter 12 and the remote equipment 10. The configuration in FIG. 4D provides powering voltage to the signal converter 12 and sealing current to the remote equipment 10. Converse to the configuration shown in FIG. 4D, the configuration shown in FIG. 4E provides powering voltage to the remote equipment 10 and sealing current to the signal converter 12. The configurations shown in FIGS. 4F, 4G, and 4H respectively show line powering configurations that provide sealing current to: 1) the remote equipment 10 only (FIG. 4F), 2) the signal converter 12 only (FIG. 4G); and 3) both the signal converter 12 and the remote equipment 10 (FIG. 4H).

It should be noted that the line powering configurations shown in FIGS. 3A–3H and FIGS. 4A–4H are exemplary. Accordingly, other line powering configurations that provide substantially the same line powering functions as those shown in the figures may be utilized.

Use of the powering shelf 16 therefore enables line powering to be performed from a location that is remote to the signal converter 12. The signal converter 12 thus may utilize the additional space on the signal interface circuitry circuit board for additional signal interfaces 19. Moreover, less heat dissipation is required in the signal converter 12 since the powering circuitry 22 is not mounted on such interface circuit board.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A system for transmitting data signals complying with a specified digital data transport protocol, the specified digital data transport protocol requiring line powering, the system comprising:
   a signal converter that converts the data signals into optical signals, the signal converter having a first interface for receiving a first data signal from a line that utilizes the specified digital data transport protocol, the first data signal complying with the specified digital data transport protocol, the signal converter also having a housing;
   a powering shelf, external and remote to the housing, for powering the line in accord with the specified digital data transport protocol, said powered line providing electrical power to said signal converter; and
   the powering shelf being in communication with the signal converter through the line.

2. The system as defined by claim 1 wherein the powering shelf includes a first powering circuit for the first interface, the first powering circuit being within the housing.

3. The system as defined by claim 2 wherein the signal converter includes a second interface for receiving, from the line, a second data signal complying with the specified digital data transport protocol.

4. The system as defined by claim 3 wherein the powering shelf includes a second powering circuit for the second interface.

5. The system as defined by claim 1 wherein the specified signal protocol is HDSL.

6. The system as defined by claim 1 wherein the line is a copper line.

7. The system as defined by claim 1 wherein the powering shelf includes transmission circuitry that receives and transmits the first data signal without significantly modifying the first data signal.

8. The system as defined by claim 1 wherein the first data signal is transmitted from a transmitting device, the powering shelf including transmitting device powering circuitry for powering the transmitting device.

9. The system as defined by claim 1 wherein the powering shelf includes signal converter powering circuitry for powering the signal converter.

10. The system as defined by claim 1 wherein the powering shelf includes sealing current circuitry for providing sealing current to the line.

11. A powering shelf for providing line powering to a line, the line transmitting data signals complying with a specified digital data transport protocol to a signal converter having a housing, the signal converter converting the data signals to optical signals, the powering shelf comprising:
   powering circuitry for powering the line in accord with the specified digital data transport protocol, said powered line providing electrical power to said signal converter;
   an input line interface for receiving the data signals from the line;
   an output line interface for transmitting the data signals to the line, the powering shelf being external and remote to the signal converter housing and communicating with the signal converter via the interfaces and the line.

12. The powering shelf as defined by claim 11 wherein the interface transmits the data signal to the signal converter without substantially modifying the data signal.

13. The powering shelf as defined by claim 11 further including a power supply for powering the powering shelf.

14. The powering shelf as defined by claim 13 wherein the power supply includes a battery.

15. The powering shelf as defined by claim 13 wherein the power supply includes a rectifier circuit for converting an AC power signal into a DC power signal.

16. The powering shelf as defined by claim 11 wherein the specified digital data transport protocol is HDSL.

17. The powering shelf as defined by claim 11 wherein the signal converter includes a plurality of data signal interfaces for interfacing with a plurality of respective data signals complying with the specified digital data transport protocol, the plurality of data signals being received by the data signal interfaces via the line, the powering shelf including:
   a plurality of powering circuits, each powering circuit having a corresponding one of the plurality of data signal interfaces.

18. The powering shelf as defined by claim 11 wherein the data signal is transmitted from a transmitting device, the powering shelf including transmitting device powering circuitry for powering the transmitting device.

19. The powering shelf as defined by claim 11 further including signal converter powering circuitry for powering the signal converter.

20. The powering shelf as defined by claim 11 further including sealing current circuitry for providing sealing current to the line.

21. A system for transmitting data signals complying with a specified digital data transport protocol, the specified digital data transport protocol requiring line powering, the system comprising:

means for converting the data signals into optical signals, the converting means having a first interface for receiving a first data signal from a line that utilizes the specified digital data transport protocol, the first data signal complying with the specified digital data transport protocol, the converting means also having a housing; and means for powering the line in accord with the specified digital data transport protocol, the powering means being external and remote to the housing, and said powered line providing electrical power to said signal converter;

the powering means being in communication with the converting means through the line.

22. The system as defined by claim 21 wherein the powering means includes a first powering circuit for the first interface.

23. The system as defined by claim 22 wherein the converting means includes a second interface for receiving, from the line, a second data signal complying with the specified digital data transport protocol.

24. The system as defined by claim 23 wherein the powering means includes a second powering circuit for the second interface.

25. The system as defined by claim 21 wherein the specified signal protocol is HDSL.

26. The system as defined by claim 21 wherein the line is a copper line.

27. The system as defined by claim 21 wherein the powering means includes transmission circuitry that receives and transmits the first data signal without significantly modifying the first data signal.

28. The system as defined by claim 21 wherein the first data signal is transmitted from a transmitting device, the powering means including transmitting device powering circuitry for powering the transmitting device.

29. The system as defined by claim 21 wherein the powering means includes sealing current circuitry for providing sealing current to the line.

30. A system for transmitting data signals complying with a specified digital data transport protocol, the specified digital data transport protocol requiring line powering, the system comprising:

a plurality of signal converters that each convert the data signals into optical signals, the signal converters each having an interface for receiving, one of the data signals from a line that utilizes the specified digital data transport protocol, the plurality of signal converters collectively having an aggregate number of the interlaces for receiving one of the data signals, the signal converters each also having a housing; and a powering shelf, external and remote to the housing, for powering the line in accord with the specified digital data transport protocol, said powered line providing electrical power to said signal converter, and the powering shelf having the aggregate number of powering modules for powering the line in accord with the digital data transport protocol; and the powering shelf being in communication with the signal converters through the line.

* * * * *